US010552899B2

(12) United States Patent
Busch

(10) Patent No.: US 10,552,899 B2
(45) Date of Patent: Feb. 4, 2020

(54) ANOMALY TRACKING SYSTEM AND METHOD FOR DETECTING FRAUD AND ERRORS IN THE HEALTHCARE FIELD

(76) Inventor: Rebecca S. Busch, Clarendon Hills, IL (US)

(*) Notice: Subject to any disclaimer, the term of this patent is extended or adjusted under 35 U.S.C. 154(b) by 1732 days.

(21) Appl. No.: 11/725,856

(22) Filed: Mar. 20, 2007

(65) Prior Publication Data

US 2007/0219820 A1   Sep. 20, 2007

Related U.S. Application Data

(60) Provisional application No. 60/861,344, filed on Nov. 28, 2006, provisional application No. 60/822,870, filed on Aug. 18, 2006, provisional application No. 60/783,892, filed on Mar. 20, 2006.

(51) Int. Cl.
*G06Q 40/00* (2012.01)
*G06Q 10/10* (2012.01)

(52) U.S. Cl.
CPC .................... *G06Q 40/00* (2013.01)

(58) Field of Classification Search
CPC ........ G06Q 50/22; G06Q 50/24; G06Q 40/00; G06Q 10/10
See application file for complete search history.

(56) References Cited

U.S. PATENT DOCUMENTS

| | | | | |
|---|---|---|---|---|
| 5,253,164 A | * | 10/1993 | Holloway et al. | 705/2 |
| 7,089,592 B2 | * | 8/2006 | Adjaoute | 726/25 |
| 7,802,722 B1 | * | 9/2010 | Papierniak et al. | 235/382 |
| 7,813,944 B1 | * | 10/2010 | Luk et al. | 705/4 |
| 2005/0044357 A1 | * | 2/2005 | Fano | 713/164 |

OTHER PUBLICATIONS

Yao et al. "Application of Genetic Algorithm and K Nearist Neighbor Method in Medical Fraud Detection" SEAL '98, 1585, pp. 74-81, 1999.*
Educators Mutual Insurance Association, BeneFacts "Watch for Improved Explanation of Benefits" Mar. 2002.*

* cited by examiner

*Primary Examiner* — Eliza A Lam
(74) *Attorney, Agent, or Firm* — Hinshaw & Culbertson LLP

(57) ABSTRACT

An electronic data analysis system and method of anomaly tracking decision trees for identifying anomalies to detect errors or fraud in multiple healthcare operational functions. The unique aspects of such electronic tools include the contemporaneous data mining and data mapping aspects of Health Information Pipelines, Private Health Information, Operational Flow Activities, Accounts Receivable Pipelines, Product Market Activity, Service Market Activity, and Consumer Market Activity in large quantities. The contemporaneous data analytics provide an effective and efficient tool for market problems such as waste, fraud, abuse, and general aberrations that impact the cost and delivery of healthcare services and products. The tool is interactive and self learning.

24 Claims, 23 Drawing Sheets

HIP/ARP - Patient

HIP/ARP – Provider (Facility)

Contract with TPA

Implement contracted Terms: Set up controls for monitoring terms.

Plan document verification/audit/monitoring

- Audits/investigations
- Eligibility of claimant
- Eligibility of charges
- Calculate benefit
- Apply appropriate deductions, co-insurance
- Verify maximum limits
- Process check or denial
- Verify TPA Fees
- Conduct QA Audits
- Verify Internal controls
- Verify Employee Internal controls Vendor audits EOB (Explanation of Benefits)

Disbursement/Payment

(Payer Fund)

(Employer Fund)

TPA Processing/Follow Ups

Employer Processing/Follow Ups

TPA Reports

FIG. 2d

Follow the Money: What is the offense?

What type of Patient?
- Insured
- Employee
- Gov. Employee
- Uninsured w $
- Uninsured w/o $

What type of Providers?
- Hospital
- OPS
- MD Office
- Nursing Home
- Other

Who is funding the plan?
- Gov. Plan
- Premium based Payer
- Self funded employer

What type of Payer?
- TPA
- TPA/Premium

Other Parties?

| Who | What | Why | Where | When |
|---|---|---|---|---|
| Data & Documents | Observations & Interviews | Analytics: $ & Operational | SOAP: Patient Information | |

| Source | Predication | Fraud Theory | Investigation & Report |
|---|---|---|---|

FRAUD PROFILER

FIG. 5a

Follow HIP & PHI:
What is the ADVERSE CLINCICAL OUTCOME?

| What type of Patient? | What type of Providers? | Who is funding the plan? | What type of Payer? | Other Parties? |
|---|---|---|---|---|
| Insured | Hospital | Gov. Plan | TPA | |
| Employee | OPS | Premium based Payer | TPA/Premium | |
| Gov. Employee | MD Office | Self funded employer | | |
| Uninsured w $ | Nursing Home | | | |
| Uninsured w/o $ | Other | | | |

| Who | What | Why | Where | When |
|---|---|---|---|---|
| Data & Documents | Observations & Interviews | Analytics: $ & Operational | SOAP: Patient Information | |

| Source | Predication | Forensic Theory | Investigation & Report |
|---|---|---|---|

MEDICAL ERROR PROFILER

FIG. 5b

Follow HIP & PHI & $:
What is the ADVERSE $ OUTCOME?

| Who | | | | What | Why | Where | When |
|---|---|---|---|---|---|---|---|
| What type of Patient? | What type of Providers? | Who is funding the plan? | What type of Payer? | Other Parties? | | | |
| Insured | Hospital | Gov. Plan | TPA | | | | |
| Employee | OPS | Premium based Payer | TPA/Premium | | | | |
| Gov. Employee | MD Office | Self funded employer | | | | | |
| Uninsured w $ | Nursing Home | | | | | | |
| Uninsured w/o $ | Other | | | | | | |
| Data & Documents | Observations & Interviews | Analytics: $ & Operational | SOAP: Patient Information |

| Source | Predication | Forensic Theory | Investigation & Report |
|---|---|---|---|

FINANCIAL ERROR PROFILER

FIG. 5c

Follow HIP & PHI & $ & HCC:
What is the DATA ABERRATION?

| Who | What | Why | Where | When |
|---|---|---|---|---|
| Data & Documents | Observations & Interviews | Analytics: $ & Operational | SOAP: Patient Information | |

What type of Patient?
- Insured
- Employee
- Gov. Employee
- Uninsured w/ $
- Uninsured w/o $

What type of Providers?
- Hospital
- OPS
- MD Office
- Nursing Home
- Other

Who is funding the plan?
- Gov. Plan
- Premium based Payer
- Self funded employer

What type of Payer?
- TPA
- TPA/Premium

Other Parties?

---

ANOMALY PROFILER

| Source | Predication | Forensic Theory | Investigation & Report |
|---|---|---|---|

FIG. 5d

Follow HIP & PHI & $ & HCC: What is the DATA ABERRATION & INTERNAL AUDIT CONTROL ISSUE?

| What type of Patient? | What type of Providers? | Who is funding the plan? | What type of Payer? | Other Parties? |
|---|---|---|---|---|
| Insured | Hospital | Gov. Plan | TPA | |
| Employee | OPS | Premium based Payer | TPA/Premium | |
| Gov. Employee | MD Office | Self funded employer | | |
| Uninsured w/ $ | Nursing Home | | | |
| Uninsured w/o $ | Other | | | |

| Who | What | Why | Where | When |
|---|---|---|---|---|
| Data & Documents | Observations & Interviews | Analytics: $ & Operational | SOAP: Patient Information | |

| Source | Predication | Audit Theory | Investigation & Report |
|---|---|---|---|

INTERNAL AUDIT PROFILER

Fig 5e

Follow HIP & PHI & $ & HCC:
What is the DATA ABERRATION?

What type of Patient?
- Insured
- Employee
- Gov. Employee
- Uninsured w/ $
- Uninsured w/o $ What type of Providers?
- Hospital
- OPS
- MD Office
- Nursing Home
- Other Who is funding the plan?
- Gov. Plan
- Premium based Payer
- Self funded employer What type of Payer?
- TPA
- TPA/Premium Other Parties?

| Who | What | Why | Where | When |
|---|---|---|---|---|
| Data & Documents | Observations & Interviews | Analytics: $ & Operational | SOAP: Patient Information | |

Source — Predication — Audit Theory — Investigation & Report

FRAUD AWARENESS PROFILER

Fig. 5f

Follow HIP & PHI & $ & HCC: What ARE THE DAMAGES?

| What type of Patient? | What type of Providers? | Who is funding the plan? | What type of Payer? | Other Parties? |
|---|---|---|---|---|
| Insured | Hospital | Gov. Plan | TPA | |
| Employee | OPS | Premium based Payer | TPA/Premium | |
| Gov. Employee | MD Office | Self funded employer | | |
| Uninsured w/ $ | Nursing Home | | | |
| Uninsured w/o $ | Other | | | |

| Who | What | Why | Where | When |
|---|---|---|---|---|
| Data & Documents | Observations & Interviews | Analytics: $ & Operational | SOAP: Patient Information | |

| Source | Predication | Subrogation Theory | Investigation & Report |
|---|---|---|---|

RECOVERY PROFILER

FIG. 5g

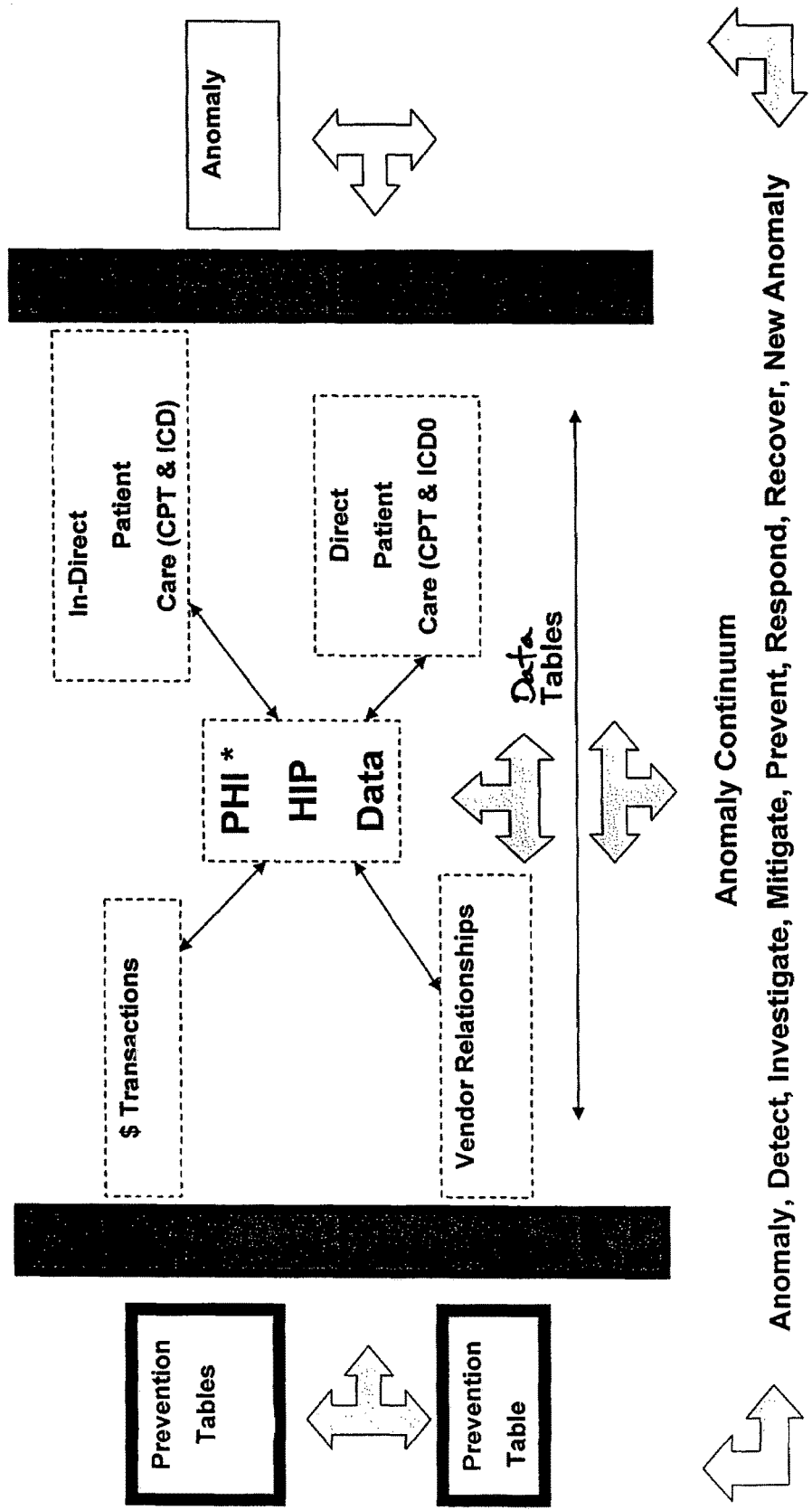

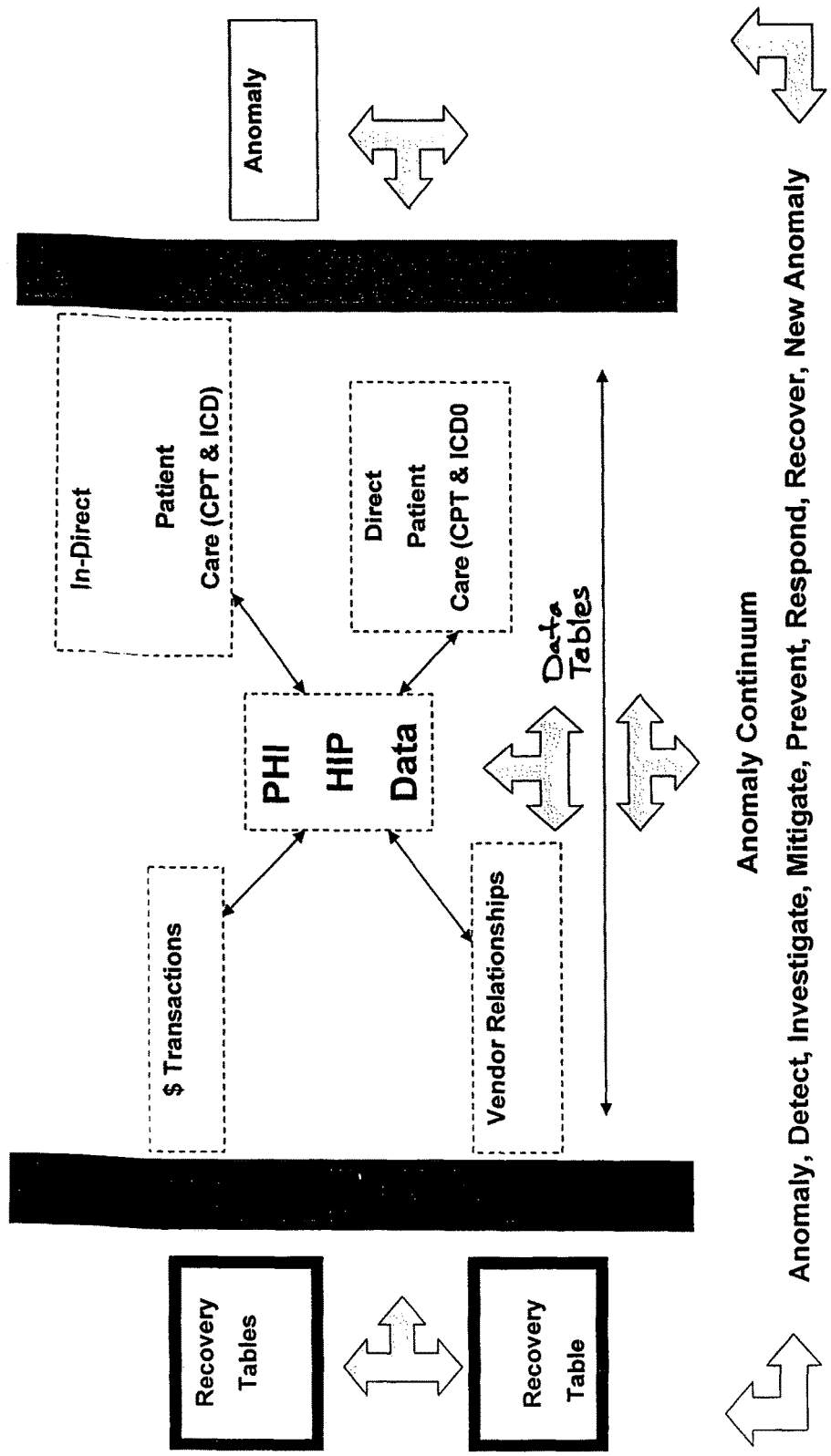

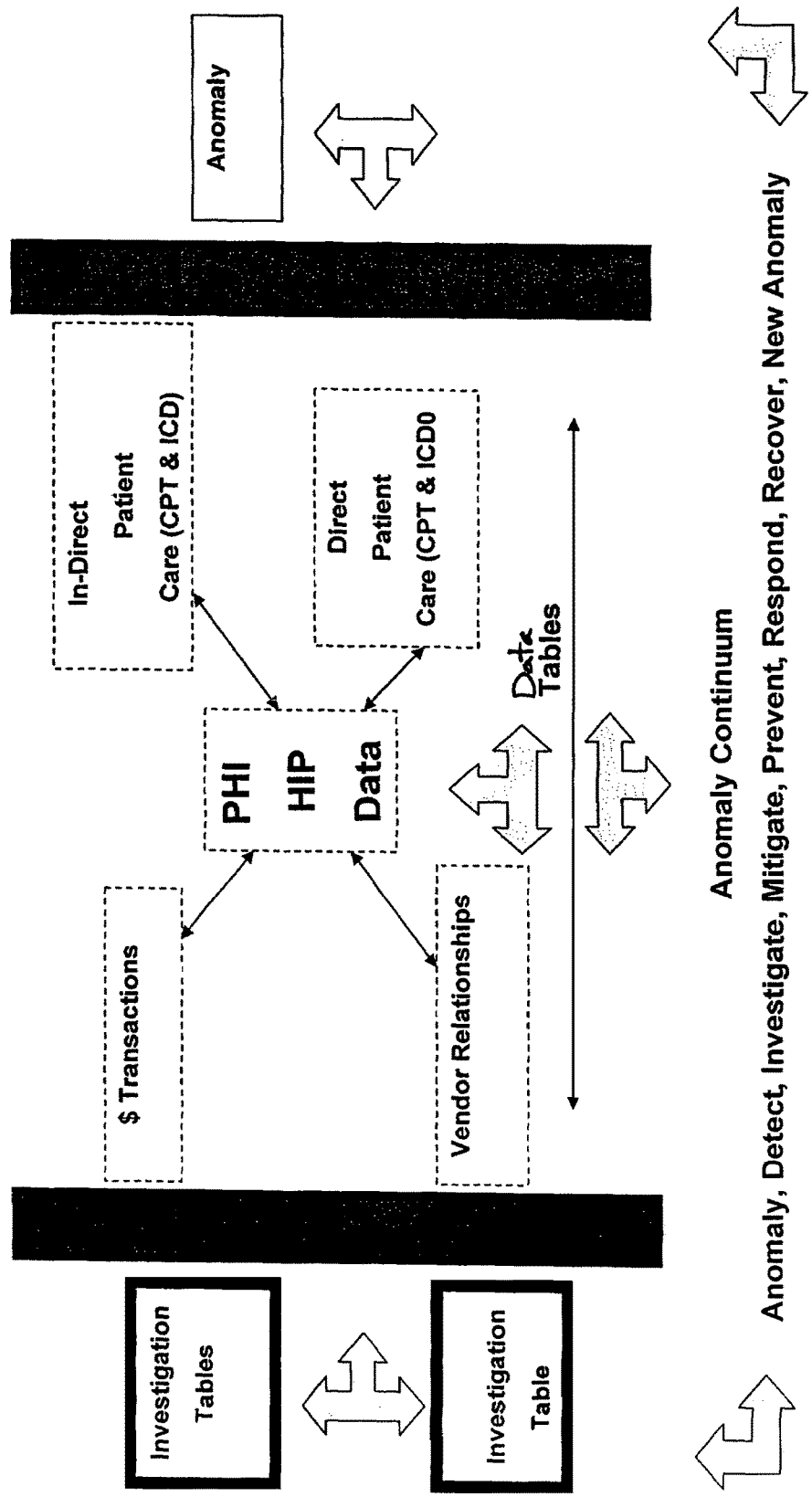

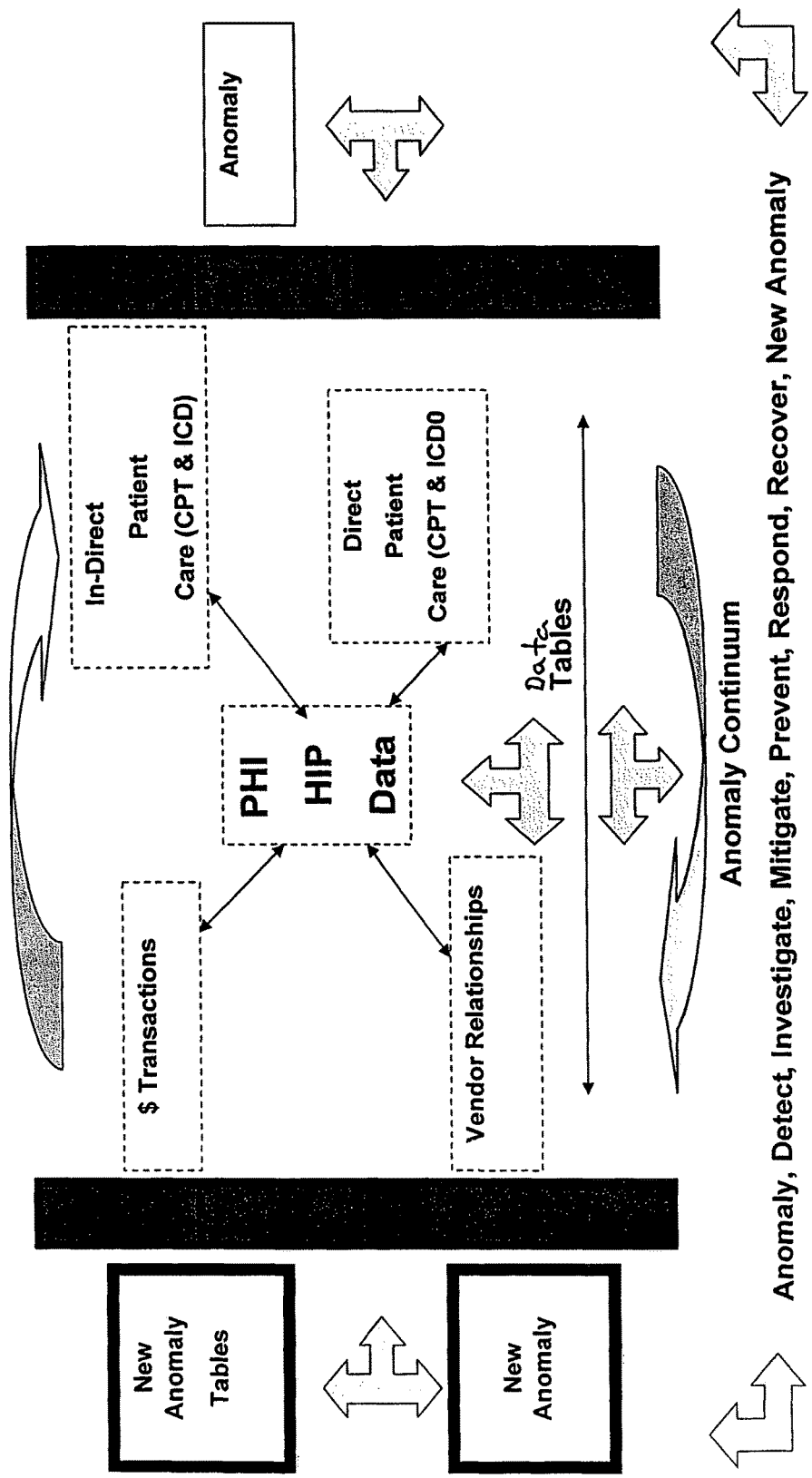

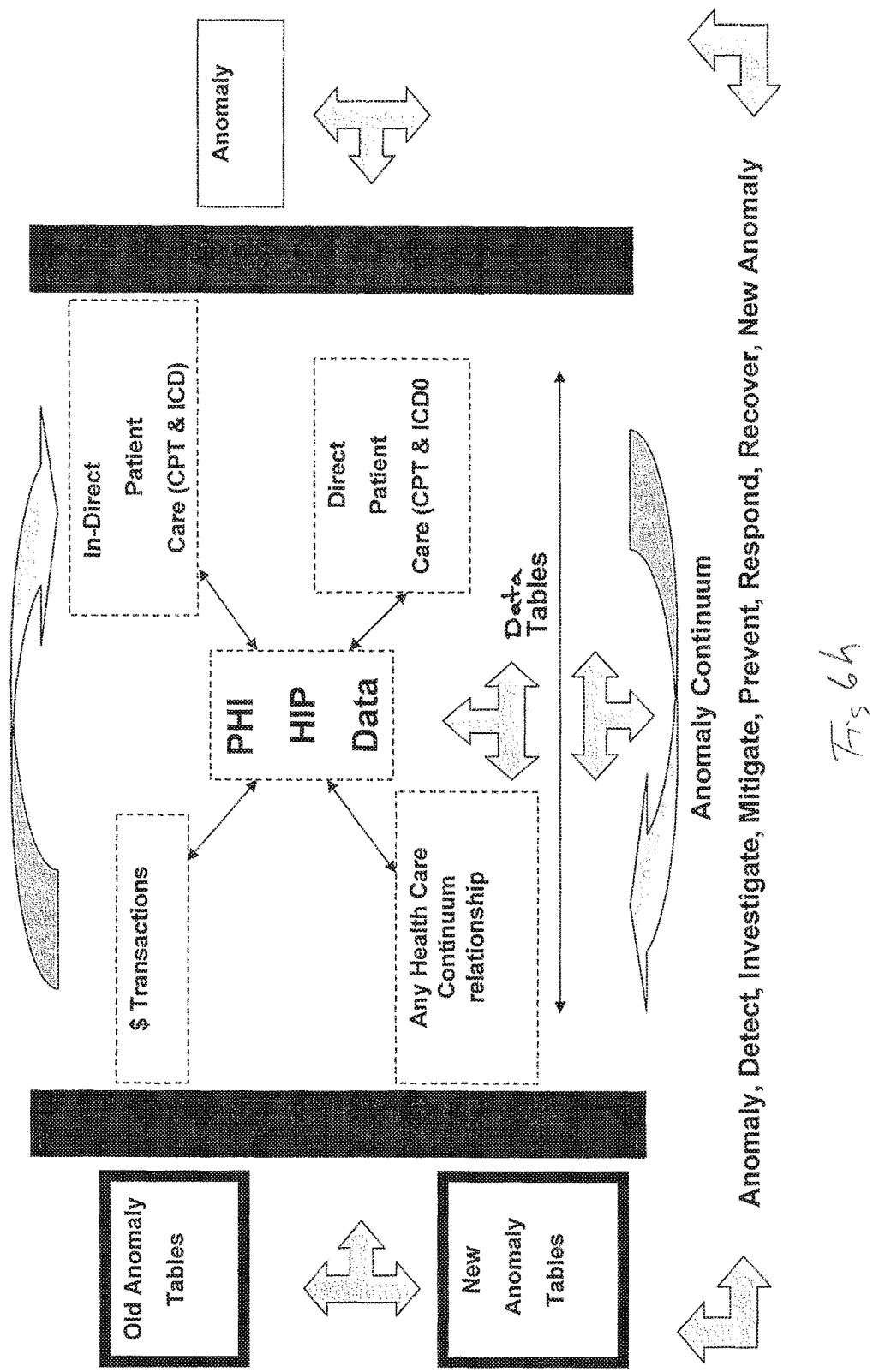

US 10,552,899 B2

ANOMALY TRACKING SYSTEM AND METHOD FOR DETECTING FRAUD AND ERRORS IN THE HEALTHCARE FIELD

CROSS-REFERENCE TO RELATED APPLICATIONS

This application claims the benefit of U.S. Provisional Application No. 60/783,892, filed Mar. 20, 2006; U.S. Provisional Application No. 60/822,870, filed Aug. 18, 2006; and U.S. Provisional Application No. 60/861,344, filed Nov. 28, 2006; the disclosures of which are hereby incorporated by reference in their entireties.

FIELD OF THE INVENTION

The invention relates to a system and method for tracking anomalies in a set of transactions, and more particularly to a system and method for tracking anomalies in transactions that occur in the provision of healthcare, in order to identify medical, financial and operational errors and fraud and abuse in the healthcare system. In addition, this invention also identifies anomalies in economic structural fraud that targets the contractual relationships in the execution of healthcare. The system includes software tools for proactive, contemporaneous, and retrospective monitoring, detection, auditing, research, investigations and analysis of transactions in the healthcare field.

BACKGROUND OF THE INVENTION

Anomalies in sets of health care transactions are good indicators of clinical and financial errors, as well as outright waste, abuse and fraud. The FBI and other government agencies have increased efforts since the 1990's to address the issues of waste, fraud, and abuse. Due to the increasing prevalence of fraud in healthcare, numerous offerings have been introduced into the market to address the problem. The offerings focus on disease management or data mining software programs to look for "red flags." Typical red flags that are looked at by payers include a medical provider charging far more than peers for particular services; a medical provider providing more tests or procedures per patient than peers; medically "unlikely" procedures such as one patient having dozens of the same tests; given the choice of similar treatments, billing for the more expensive one more often than peers; a high percentage of patients traveling long distances for routine services or tests; and high prices for medical equipment or supplies that can be purchased for far less.

Statistics show that $108 billion (16%) of total healthcare costs in the United States is paid improperly due to billing errors (see www.cms.gov); $33 billion Medicare dollars (7%) are based on fraudulent claims billed to the government (see www.ncpa.org); $100 billion private payer dollars (20%) are estimated to be paid improperly (MBA audit statistics); $50 billion or 10% of private payer claims are attributed to health care fraud (Source: Blue Cross Blue Shield); each year there are some $37.6 billion in medical errors (see www.ahcpr.gov); 10% of drugs sold worldwide are counterfeit (up to 50% in some countries) (see www.fda.gov); the prescription drug market is $121.8 billion (see www.cms.gov); and the counterfeit price tag is $12.8 billion.

In calendar year 2003, health care expenditures amounted to $1.7 trillion (Source: the Office of the Actuary, Centers for Medicare & Medicaid Services). In that same year, it is estimated that losses due to fraud were 3-10% of the total amount of health care expenditures, or $51-170 billion. The health care industry is in a strikingly similar position to that of the financial services industry fifteen years ago. Technology can play a critical role in detecting fraud and abuse and it can help to pave the way toward prevention. Technology can play a critical role in understanding market dynamics by looking at data in its individual and aggregate form. Therefore, there is a need for a software tool that provides micro and macro analysis of healthcare continuum data.

Currently, only limited data is captured on economic structural fraud. This type of fraud may include fee splitting, falsifying performance guarantees, kickbacks, payments to undisclosed parties, and other financial contractual misrepresentations.

Healthcare fraud is growing at an accelerated rate in the United States. Traditional schemes include false claim submissions, care that lacks medical necessity, controlled substance abuse, upcoding (billing for more expensive procedures), employee-plan fraud, staged accident rings, waiver of co-payments and deductibles, billing experimental treatments as nonexperimental ones, agent-broker fraud relationships, premium fraud, bad-faith claim payment activities, quackery, over utilization (rendering more services than are necessary), and kickbacks. Evolved schemes include complex rent-a-patient activities, 340 B program abuse activities (setting aside discounted drugs, making them unavailable to those in need), pill mill schemes (schemes to falsely bill prescriptions), counterfeit drug activities, and organized criminal schemes.

These statistics highlight the problems that arise from numerous types of healthcare transactions. Unfortunately, current market offerings fall short of addressing all of the issues. The current market offerings tend to focus at some level of audit but not comprehensive work; and specifically on provider fraud. The market does not offer a contemporaneous software program that addresses prevention, detection, investigation, and mitigation. The market tool offerings are weak on organized crime, employer, payer, and vendor healthcare fraud tools.

It is generally known that initiatives for fraud prevention and detection are expected within the government programs. It is generally known that initiatives for fraud prevention and detection are in the privately managed programs. It is not generally known how to prevent, detect, and prosecute contemporaneous routes of fraud from multiple financial, operational functions, and entities. Waste and abuse both incorporate operational inefficiencies through the health care continuum.

There is a need for an anomaly tracking system which targets all in which clinical or financial transactions occur within a patient, provider, payer, plan sponsor (employer plan), or vendor categories.

SUMMARY OF THE INVENTION

In accordance with the invention, a method for identifying an anomaly in a set of transactions comprises the steps of: identifying a clinical, financial or contractual question, selecting at least two sources or types of transaction data based on the question; selecting at least one profiler for analyzing the selected data; selecting at least one model for generating the desired output data; executing the profiler and modeler to analyze the selected data and output the output data; storing the output data in a master data set; executing a data analysis algorithm on the master database to generate a list of finding and anomalies; and deriving at least one logical conclusion from the findings and anomalies to identify the anomaly and answer the question.

In another aspect, a method for identifying an anomaly in a set of transactions comprises the steps of: selecting at least two transaction data tables; merging the selected data tables to form a merged data table; selecting at least one profiler and at least one model; executing the profiler and model to analyze the merged data table and output resulting data; storing the resulting data in a master database; executing an algorithm to analyze the data in the master database to identify at least one anomaly; and deriving a logical conclusion from the anomaly.

In another aspect of the invention, a data processing system for identifying an anomaly in a set of transactions comprises: a computer processor; and a memory responsively coupled to the computer processor containing a set of computer instructions for: (a) selecting at least two transaction data tables; (b) merging the selected data tables to form a merged data table; (c) selecting at least one profiler; (d) selecting at least one model; (e) executing the profiler and the model to analyze the merged data table; (f) storing the resulting data in a master database; (g) executing an algorithm to analyze the data in the master database to identify at least one anomaly; and (h) deriving a logical conclusion from the at least one anomaly.

In still another aspect of the invention, a non-volatile storage medium contains computer software encoded in a machine readable format for analyzing a set of transaction data, the software comprising: a set of computer instructions for selecting at least two transaction data tables; a set of computer instructions for merging the selected data tables to form a merged data table; a set of computer instructions for selecting a profiler; a set of computer instructions for selecting a model; a set of computer instructions for executing the profiler and the model to analyze the merged data; a set of computer instructions for storing the resulting data in a master database; a set of computer instructions for executing an algorithm to analyze the data in the master database to identify at least one anomaly; and a set of computer instructions for deriving a logical conclusion from the at least one anomaly.

BRIEF DESCRIPTION OF THE DRAWINGS

FIG. 2d is a chart showing an HIP and ARP for an employer.

FIG. 5a is an exemplary header for a fraud profiler.

FIG. 5b is an exemplary header for a medical error profiler.

FIG. 5c is an exemplary header for a financial error profiler.

FIG. 5d is an exemplary header for an anomaly profiler.

FIG. 5e is an exemplary header for an internal audit profiler.

FIG. 5f is an exemplary header for a fraud awareness profiler.

FIG. 5g is an exemplary header for a recovery profiler.

FIG. 6c is an exemplary header for a prevention model.

FIG. 6d is an exemplary header for a response model.

FIG. 6e is an exemplary header for a recovery model.

FIG. 6f is an exemplary header for an investigation model.

FIG. 6g is an exemplary header for a micro level model.

FIG. 6h is an exemplary header for a macro level model.

DETAILED DESCRIPTION OF THE INVENTION

The system and method of the invention utilize a software Electronic Data Analysis ("EDA") tool for proactive, retrospective and/or contemporaneous monitoring, detection, research, investigations, and analysis of clinical and financial transactions in the healthcare continuum ("HCC"). The tool uses anomaly tracking decision trees to identify anomalies in several healthcare operational functions.

Figure 1:
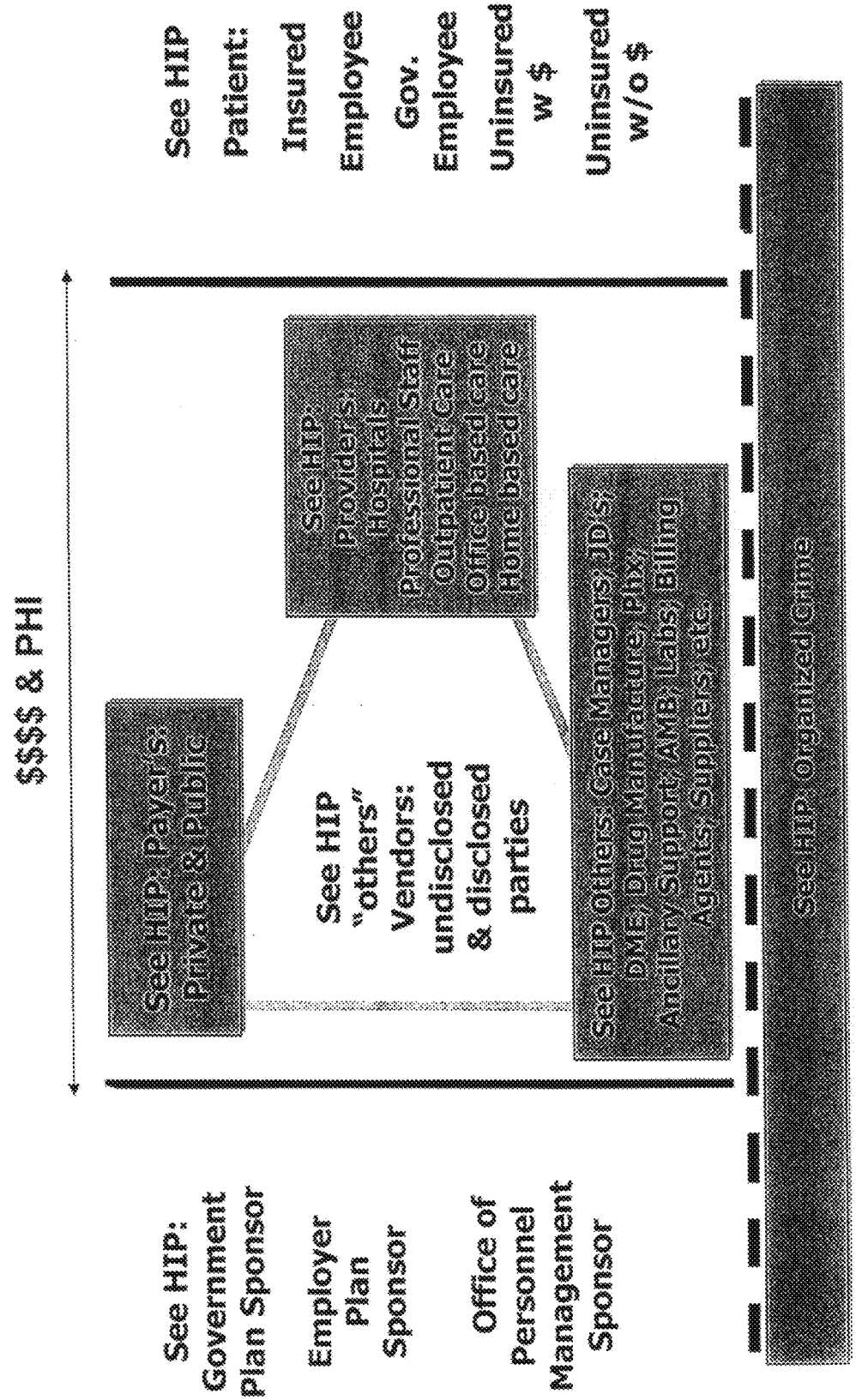
FIG. 1 is an overview of the invention within the healthcare continuum.

The term HCC refers generally to all of the entities that can and will most likely impact an episode of care. As shown in FIG. 1, the HCC includes health information pipelines (HIPs) for each market player. The monetary transactions in the HCC are referred to as accounts receivable pipelines (ARPs), which provide audit trails of protected health information (PHI). In the HCC model, money is viewed as equivalent to PHI, and each entity has PHI generated or processed. At each transfer point, money is generated or processed at the same time. FIG. 1 shows organized crime as a disconnected illegitimate third party. It is given its own designation as an entity because of the growing number of complex organized crime schemes integrated into the normal flow of business.

The unique aspects of the tool of the invention include the contemporaneous data mining and data mapping aspects of HIP's, ARP's, PHI's, OFA's, PMA's, SMA's and CMA's in large quantities. For reference throughout the following description and examples, the following glossary of terms will be useful.

HCC is the identification of the health care continuum player involved in the transactions, namely the patient, provider, payer, employer/plan sponsor, vendor or supplier, government, staff, or unauthorized parties.

Health Information Pipeline ("HIP") is the identification of health information in and among each HCC member.

Accounts Receivable Pipeline ("ARP") is the identification of the monetary and contractual aspects of the health information in and among each HCC member.

Operational Flow Activity ("OFA") is the identification of the procedural aspects of the health information and the monetary transactions in and among each HCC member.

Product Market Activity ("PMA") is the identification of products involved in the delivery of healthcare services in and among each HCC member.

Service Market Activity ("SMA") is the identification of the services involved in the delivery of healthcare services in and among each HCC member.

Consumer Market Activity ("CMA") is the identification of the consumer selection or choice activity in the delivery of healthcare services in and among each HCC member.

Five major players use recognized operational structures, or business functions, within the HCC. These structures include the patient, the provider, the payer, the plan sponsor, and the vendor. Healthcare as an industry is unique in that one episode of care at some given time will typically involve three or more operational structures and their respective contractual arrangements. The patient is the individual who actually receives a healthcare service. The provider is an individual or entity that delivers or executes the healthcare service. The payer is the entity that processes the financial transaction. The plan sponsor is the party that funds the transaction. Plan sponsors include private self-insurance programs, employer-based premium programs, and government programs such as Medicare and Medicaid. A vendor is any entity that provides a professional service or materials used in the delivery of patient care.

Unrecognized players are organized crime entities which use recognized structures or business function within the HCC. The preferred embodiment of this invention applies to both recognized and unrecognized market players.

Figure 2A:
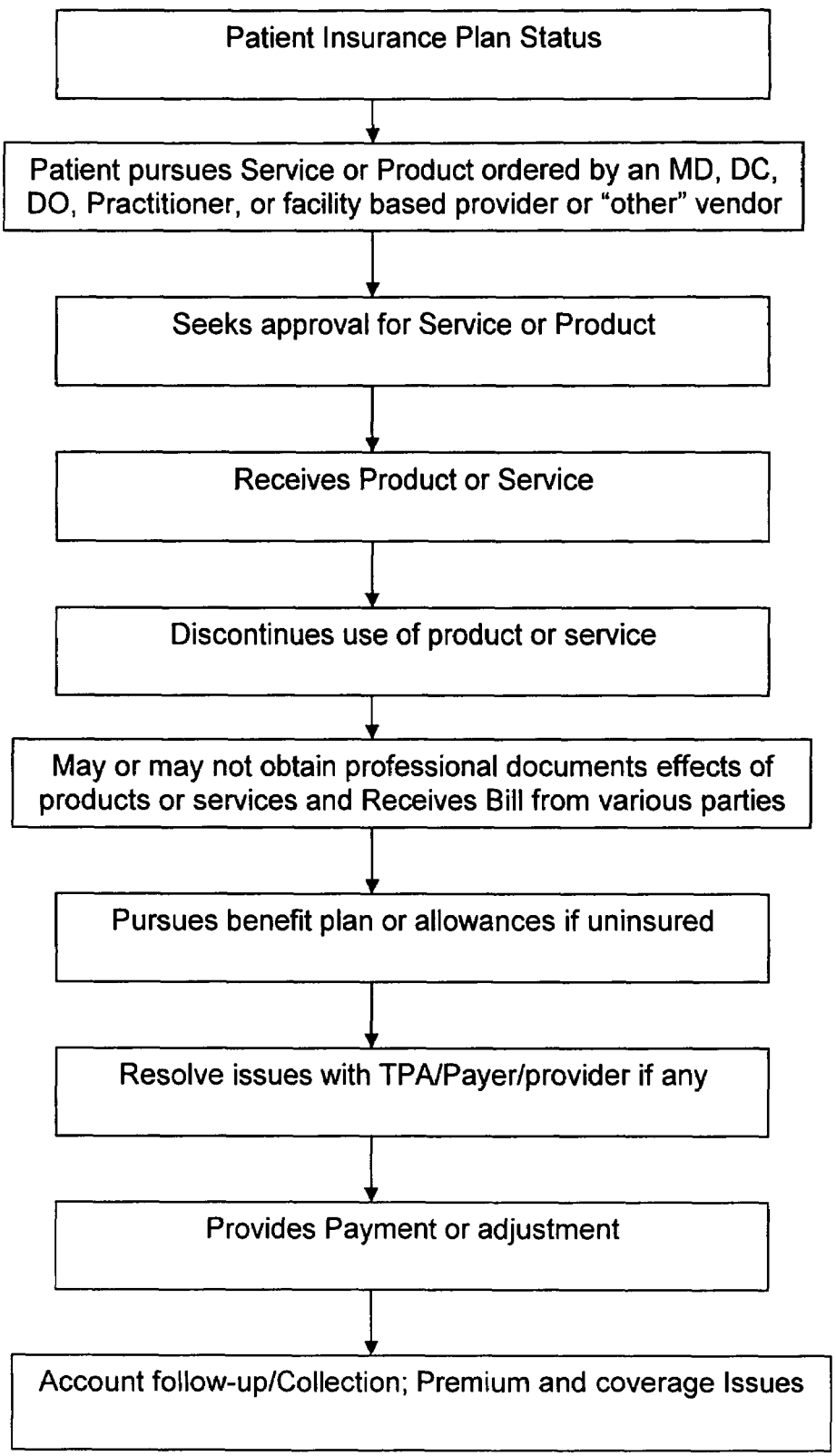
FIG. 2a is a chart showing a Healthcare Information Pipeline (HIP) and Accounts Receivable Pipeline (ARP) for a patient.
Figure 2B:
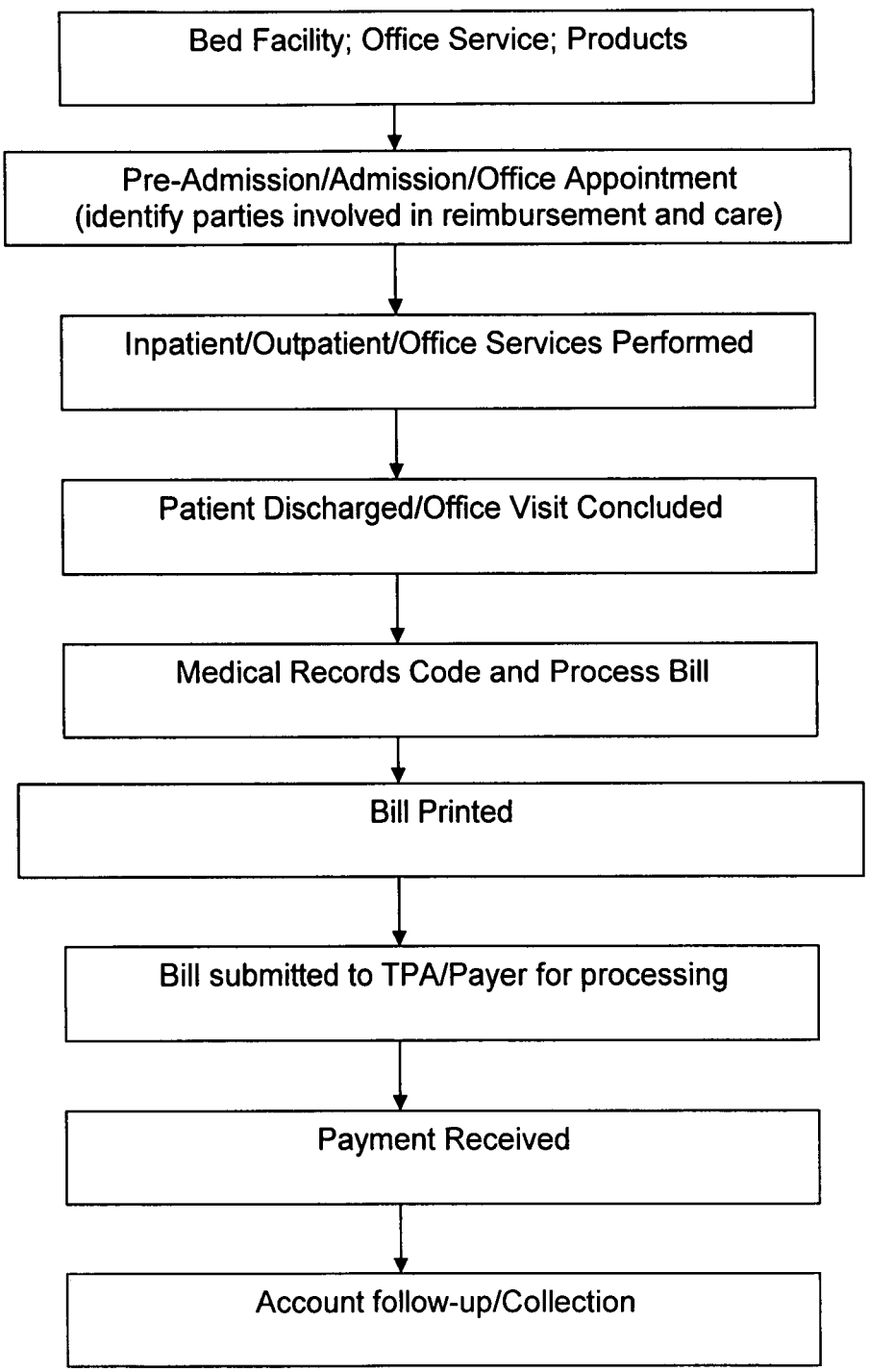
FIG. 2b is a chart showing an HIP and ARP for a facility/provider.
Figure 2C:
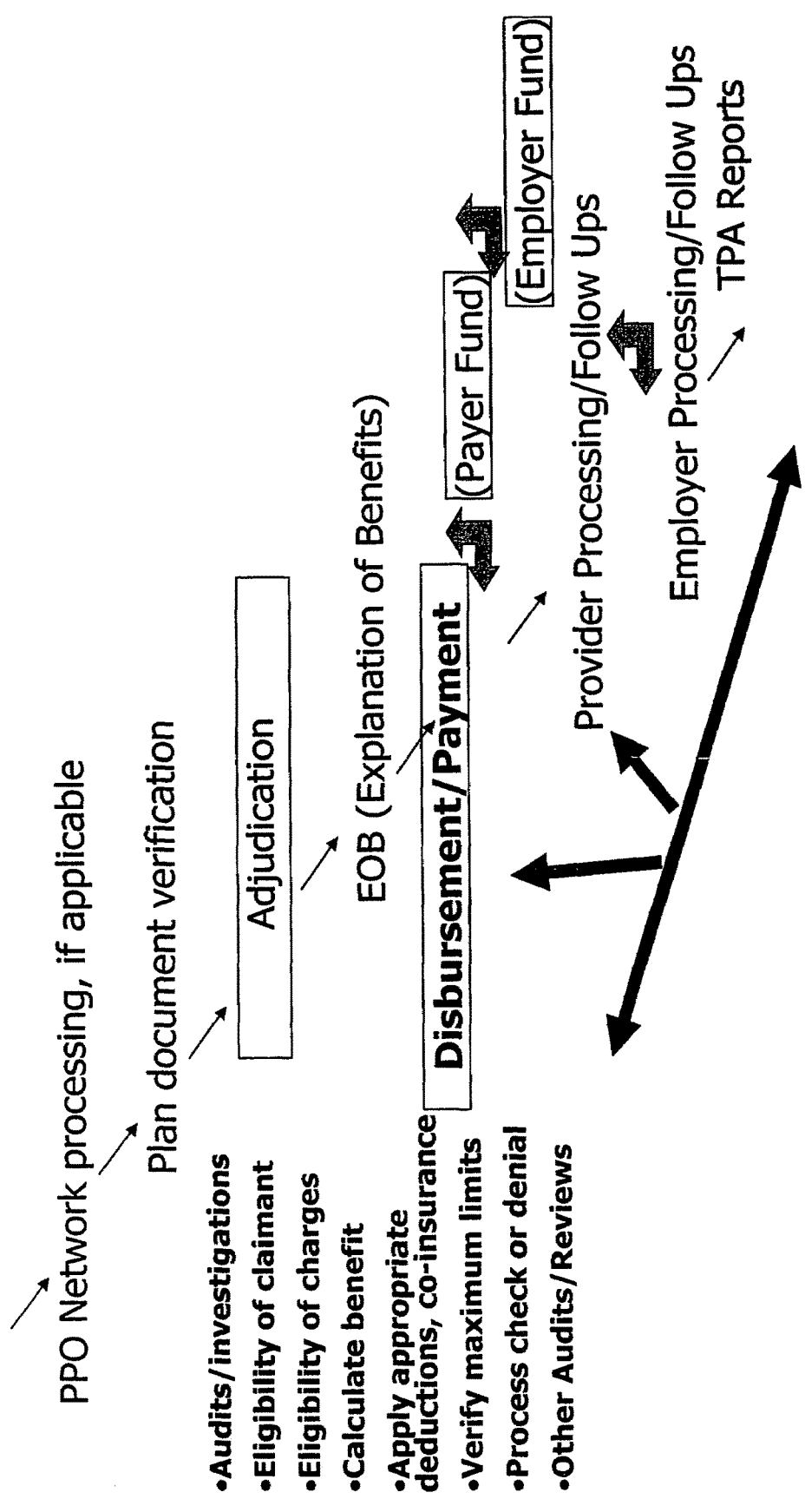
FIG. 2c is a chart showing an HIP and ARP for a payer.

FIG. 2 illustrates the HIP's with ARP's for several of the key players in the HCC. Specifically, FIG. 2a shows the HIP-Patient; FIG. 2b shows the HIP-Provider; FIG. 2c shows the HIP-Payer and FIG. 2d shows the HIP-Employer. There may also be HIP's for "other" players, also referred to as vendors, which may range from providers of pharmaceuticals, durable medical equipment, or services such as ambulance transportation. They are similar in structure in terms of having a health information pipeline.

One element common among all HCC players is the patient's protected health information (PHI) (also called identifiable protected health information, or IPHI). PHI is common, too, among many fraud schemes. Access to PHI is key, both for those who perpetrate fraud schemes and for those who act as gatekeepers or damage control experts.

The data in ARP's typically originates with the submission of a claim from the provider of services or products, for example, using a facility-based claim form known as a Universal Billing form, or UB-92. (A new form, the UB-04, is being implemented in 2007 with updates to facilitate communications and documentation for the submission of claims.) ARPs track how money moves in the HCC.

Further unique aspects including integrating verbal, paper, and electronic data elements from various sources. In the HCC, there may be up to five undisclosed contracts, e.g., between the payer and the employer, the provider and the payer, etc. Each player does not necessarily have access to the information of another player, since much of the PHI is deemed proprietary. For example, a payer will often not reveal the actual check cut to the provider, because the amount of money charged back to the employer includes a profit. Looking only at data from one player may not provide enough information to understand what has transpired. The system of the invention is capable of building a complete data set on a player-by-player basis. This complete data can be compared to other data, such as historical data or peer data.

Figure 3:
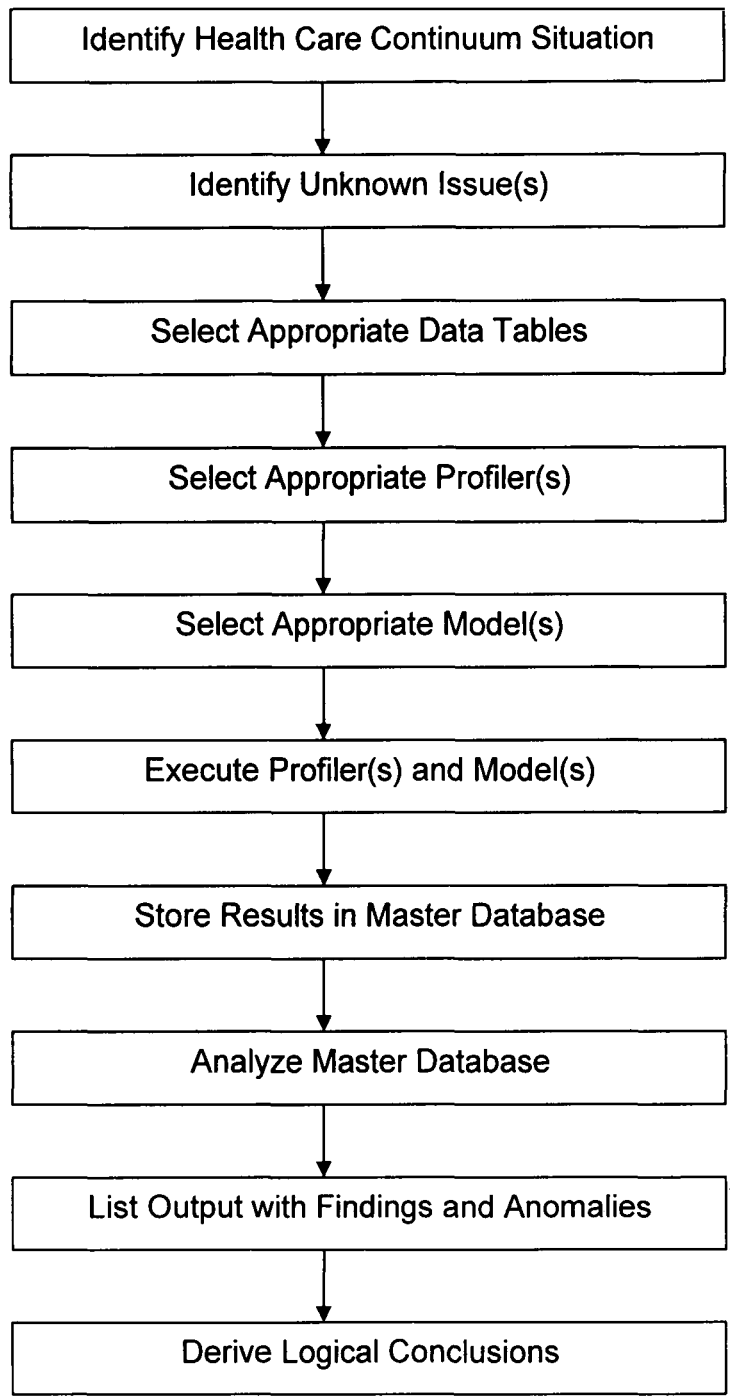
FIG. 3 is a flowchart of the general method of the invention.

FIG. 3 illustrates an overview of the preferred embodiment of the method of the invention as applied to a situation in the healthcare continuum. The method begins with the identification of an unknown issue or question. The issue or question may be of a clinical or financial nature, and may originate from a patient, provider, payer, plan sponsor or other source. The unknown may exist between two or more parties or within one particular party. Based on the issue, two or more appropriate sources of data, in the form of data tables, are selected. Preferably, the selected data tables are merged, initially on a specific data set selection, and then reconciled against the entire table. Next, one or more profilers and one or more appropriate models are selected. The algorithms of the selected profiler(s) and model(s) are executed on the data from the selected tables, and the results are stored in a master database. Electronic discovery analysis is then performed within the master database, which yields an output of anomalies, from which a final inference may be drawn. The inference step may be computerized or manual. If computerized, the software compares the list of anomalies to prior data in the master database and notes what is abnormal. If manual, a trained person reviews the list of anomalies and draws the inference based on experience and training. Each time the process is executed, data is added to the master database for future use.

Figure 3A:
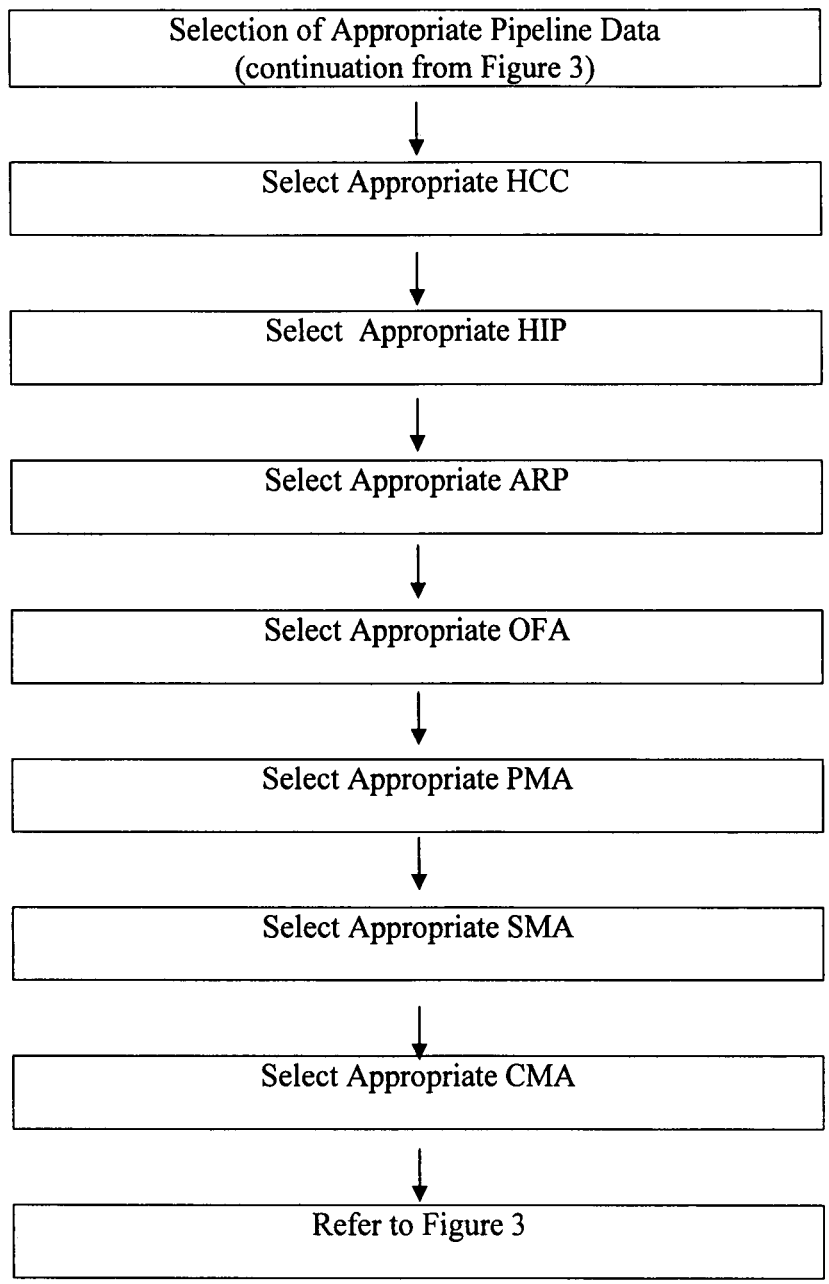
FIG. 3a is a flowchart of the general pipelines applied in the invention.

FIG. 3a illustrates an overview of the preferred embodiment of the method of the invention as applied to the integration of the identified pipelines within the healthcare continuum. The method is applied by identification of HIP (health information within the operational structure), followed by identification of the respective ARP (monetary and contractual aspects of the HIP), followed further by identification of the respective OFA (procedural aspects of the HIP and ARP). The method continues with the respective PMA and SMA (respective products and services identified in the HIP, ARP and OFA), and finally, the integration of the CMA (consumer market activity associated with the respective identified HIP; ARP; OFA; PMA; SMA).

Health information includes all the data that is created throughout the healthcare continuum, e.g., personal, clinical and financial. It can result from the generation of, processing of, mining of, mapping of, manipulation of and organization of data in a way that adds diagnostics, knowledge, solutions, and alternatives to the person receiving or sending it. It includes communications, instructions, meanings, patterns, perceptions, and representations of the patient and those involved with and impacted by the patient.

HIP's represent the operational decision trees in which health information is typically channeled, as may be seen in FIGS. 2a-d. The implications for error and fraud prevention are primarily focused on internal controls. Preferably, the audit log infrastructure and edit controls provided in the system flag a transaction before it becomes an issue. However, if a breach does occur, the system will detect anomalies, trace them to their generation and point of processing, and preferably, to any form of the information's use. In the context of the system, HIP's serve as a roadmap for detection of anomalies and hence, errors or fraud. By following all possible uses of the information, the system can detect the types of fraudulent schemes that are perpetrated with health information. Since health information is equivalent to money, during all of its normal uses, health information can be converted toward an illicit monetary gain. The system includes well-developed process flow charts and electronic systems that include an active audit log within these HIP's to guide a comprehensive discovery process and lead toward a successful investigation of an anomaly.

Referring again to FIG. 3, the data tables includes tables of data for HIP-Patient, HIP-Facility, HIP-Other, HIP-Payer, HIP-Employer, as well as facility data, professional data, revenue codes and the like. Use of historical data and peer data, market standards for internal controls, and market standards of medical necessity can assist in identifying errors and fraud. Historical and peer data are maintained in a growing table for each respective HIP, then dumped into the master database. Peer analysis can be done in the HIP, while reconciliation for fraud is done in the master database.

Figure 4:
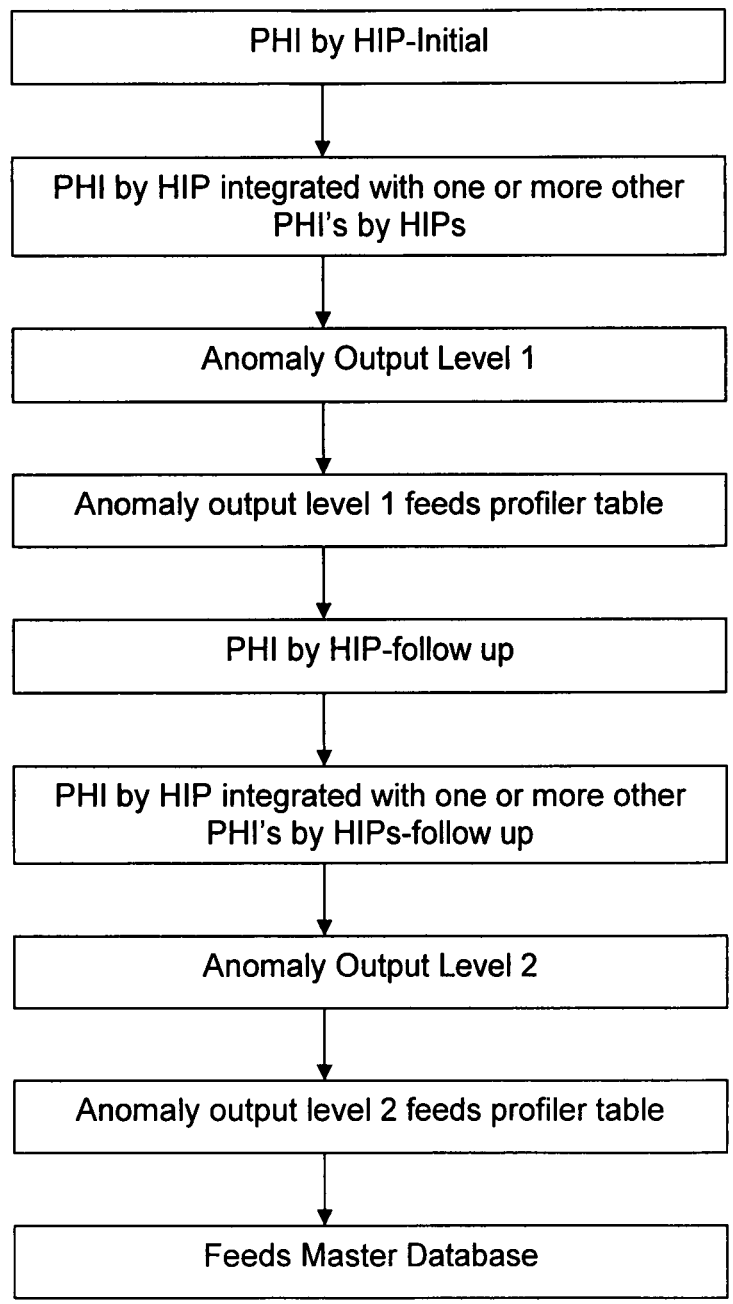
FIG. 4 is a chart of the master data flow in the system and method of the invention.

As shown in FIG. 4, the master data flow is designed to process the movement of information (in HIPs and ARPs)

and to process the content of that information. Data from computerized and paper sources are integrated. PHI and monetary transactions are integrated throughout the HIP's. The system also integrates complex contractual relationships, fee schedule arrangements, etc. In an initial step, a PHI by HIP is integrated with one or more other PHI's by HIPs, and an anomaly output level 1 is generated, which feed a Profiler (discussed below). In a follow-up step, the process is repeated, generating an anomaly output level 2, which again feeds a profiler. The outputs of the profilers (and models, as discussed below) feed a master database. This process is continuing and evolving, building upon itself and creating a more complete and useful master database.

The system includes various Profilers for analyzing the data in different HCC situations. The types of Profilers may include, for example, a Fraud Profiler, Medical Error Profiler, Financial Error Profiler, Anomaly Profiler, Internal Audit Profiler, Fraud Awareness Profiler and Recovery Profiler. The algorithms in the Profilers perform various types of statistical analysis on the selected data, including well-known analytics such as linear regression, standard deviation, etc. The analytics are selected for each Profiler based upon the type of data and analysis desired.

The headers for several types of Profilers are shown in FIG. 5. Specifically, FIG. 5a shows the header for a fraud profiler, FIG. 5b shows a header for a medical error profiler, FIG. 5c shows the header for a financial error profiler, FIG. 5d shows the header for an anomaly profiler, FIG. 5e shows the header for an internal audit profiler, FIG. 5f shows the header for a fraud awareness profiler and FIG. 5g shows the header for a recovery profiler. The headers are part of the decision tree in each Profiler. The flow starts at the top left and proceeds left-to-right, then next row down left-to-right, next row left-to-right, and so on. This illustrates the process of integrating the data from the various sources. When the process executes a Profiler and encounters a header, the system will retrieve the table electronically or, if there is no electronic record, prompt the user to collect the data manually (from paper or oral sources for example) and enter the data, whereupon the system will store the entered data electronically.

The system also includes various Models for further data analysis and output. The types of models may include, for example, the Detection Model, Mitigation Model, Prevention Model, Response Model, Recovery Model, Investigation Model and Micro Level Model. The algorithms in the Models, again including analytics for statistical analysis, will depend on the nature of the HCC situation and the question, e.g., is it a proactive inquiry or a historical investigation? Each model has a header similar to the headers for the Profilers; they are part of the decision tree in the Model and generally function as previously described for the Profilers.

Figure 6A:
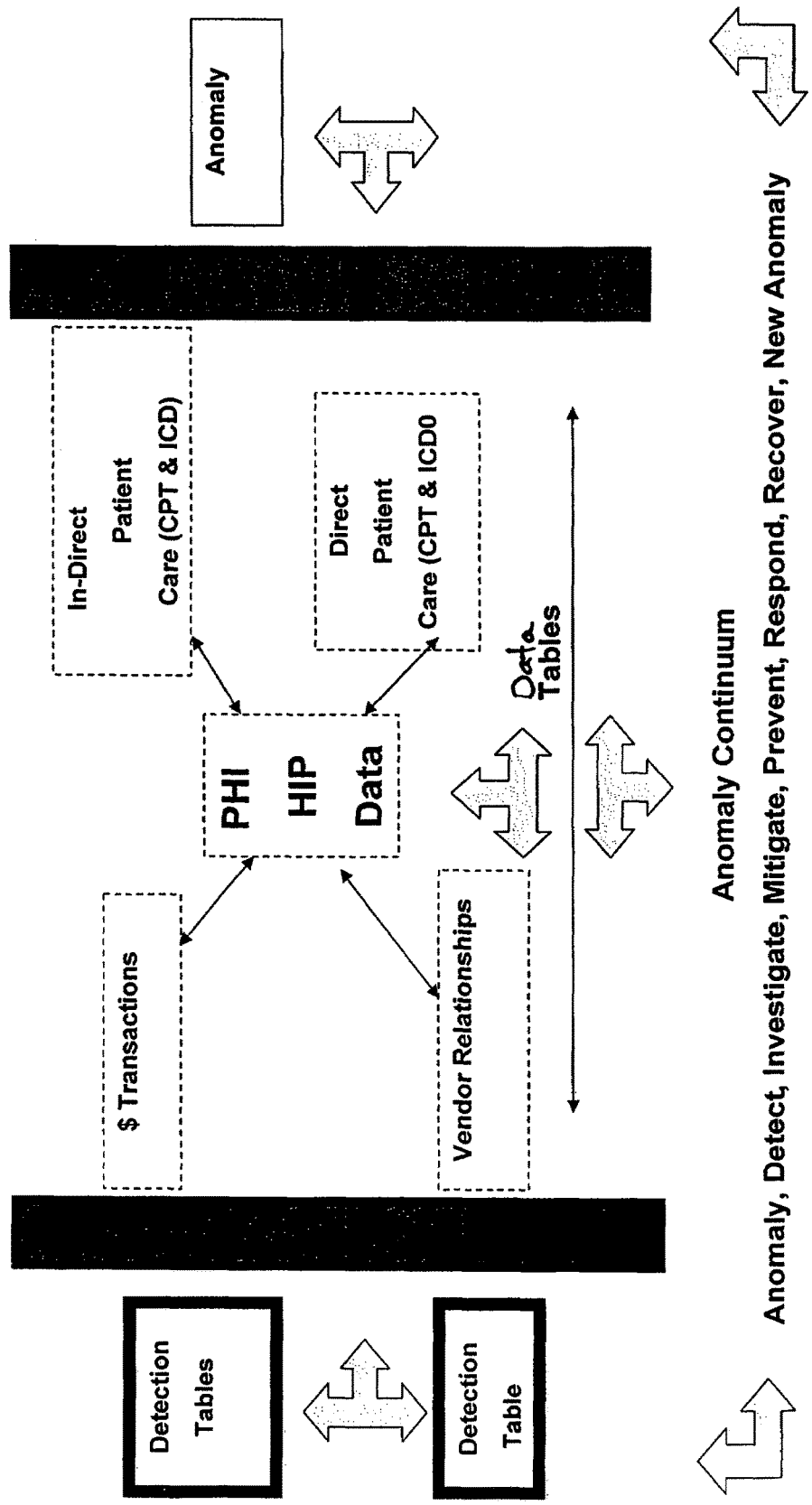
FIG. 6a is an exemplary header for a detection model.
Figure 6B:
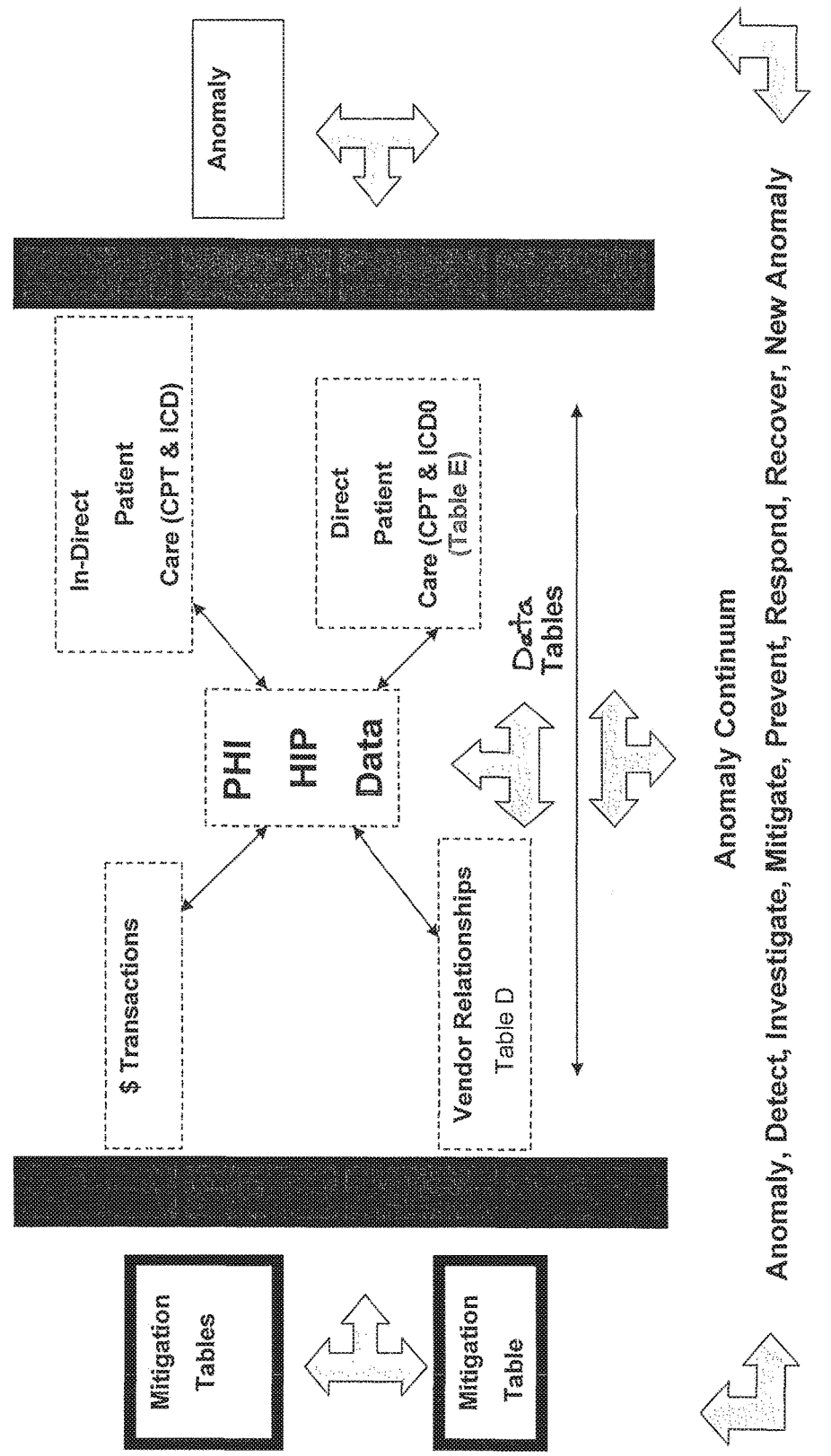
FIG. 6b is an exemplary header for a mitigation model.
Figure 6B:
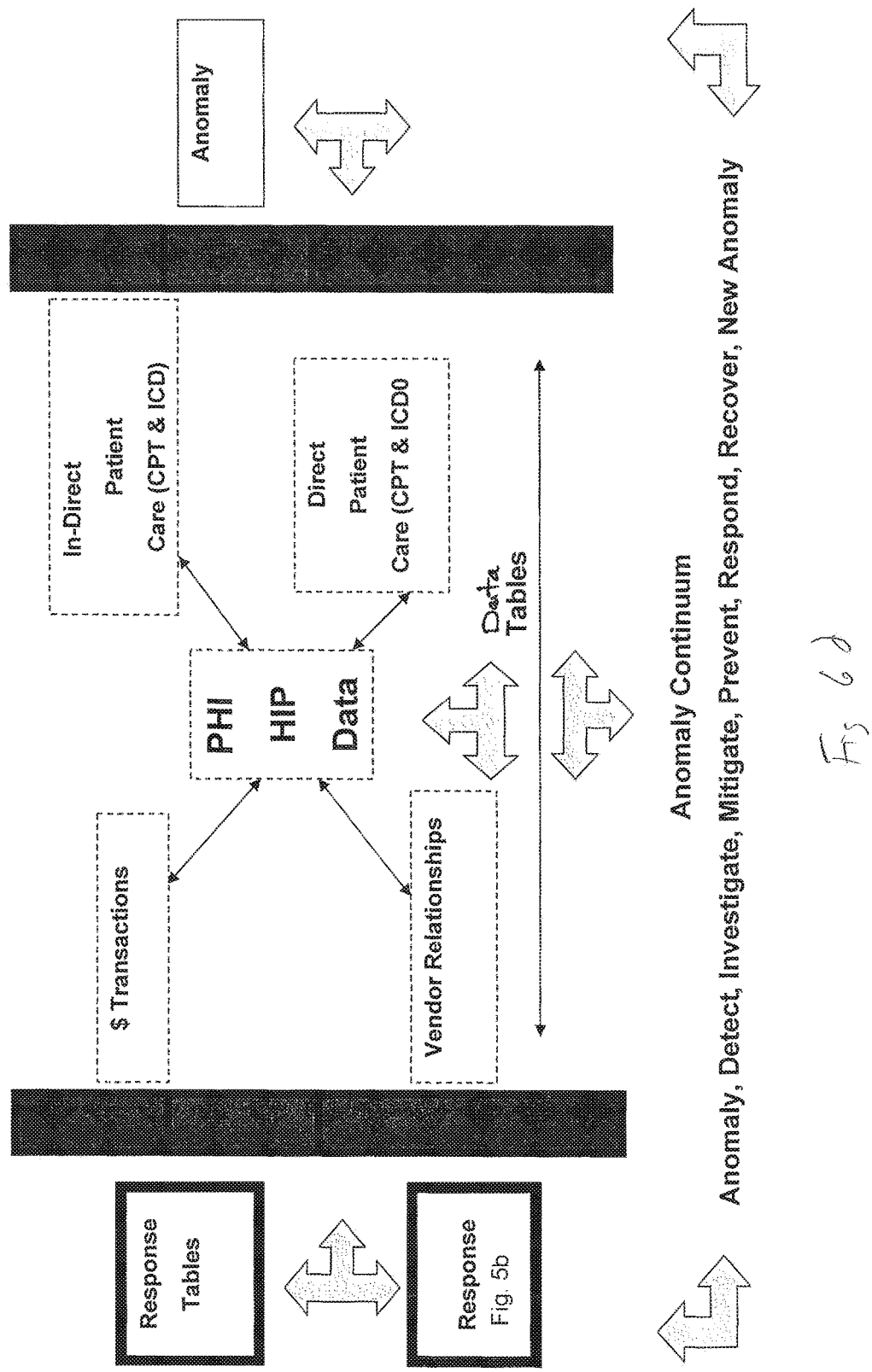

The data flow of PHI and money in the system for several types of Models are shown in FIG. 6. Specifically, FIG. 6a shows the data flow for a detection model; FIG. 6b shows the data flow for a mitigation model; FIG. 6c shows the data flow for a prevention model; FIG. 6d shows the data flow for a response model; FIG. 6e shows the data flow for a recovery model; FIG. 6f shows the data flow for an investigation model; FIG. 6g shows the data flow for a micro level model; and FIG. 6h shows the data flow for a macro level model.

The sequence of executing the Profiler(s) and Model(s) may vary. If the question presents a new subject for which there is no, or limited, data in the master database, the sequence is from Profiler to Model. If the question represents a recurring issue for which there is existing data, or a variation thereof, the system will reconcile from model back to profiler. This is a self-learning aspect of the system. Results from the Profilers and Models are stored in the master database. The data in the master database is the analyzed using an appropriate EDA technique, i.e., electronic discovery analysis tools such as data mining and data mapping, and an anomaly list is generated. From this list, a final inference may be drawn as previously described, with the inference logic based conclusion derived from output data also being fed back into the master database. Since the master database is updated each time a query is executed, the system inherently provides development and self learning components consisting of both old and new data elements stored in the master database.

The method and system of the invention may be implemented using conventional database management software (DBMS), such as Microsoft Access®. Such software typically provides for setting up and organizing the database, and also includes querying and reporting tools. The algorithms for the profilers and Models, as well as the EDA performed on the master database, may be coded as macros in the DBMS.

The method and system of the invention described above will now be explained in more detail by reference to two examples.

The first example is a medical error application as shown in FIG. 7. The situation in the HCC is that a patient leaves the hospital with a left forearm chemical burn. The question presented is, what caused the burn? To answer the question, five data sources are selected: (1) HIP-Patient Data Table; (2) HIP-Provider Data Table; (3) Revenue Codes Table; (4) Facility-Based PHI Data Table; and (5) Professional-Based Data Table. Selected records of data from each table are merged. The master data flow algorithms are executed on the merged data. The Detection Model and Response Model algorithms are selected and executed, and the results are output into the Medical Error Profiler. The Medical Error Profiler algorithms are executed, yielding the following findings and anomalies:

1. The medical record documented administration of intravenous (IV) fluids.
2. The medical record did not document the type of IV used.
3. The medical record did not document the name of the drug or the dose.
4. The itemized bill posted a charge for Vancomycin at three times the appropriate dose.
5. The medical record had lapses in time.
6. The itemized bill did not indicate that a charge for IV tubing or liter fluids was processed.

Based on the list of findings and anomalies, an inference may be drawn that the patient was given an abnormal dose of Vancomycin, administered via heparin lock versus with IV tubing and a liter fluid bag. When administered without a liter bag and in a high dose, this can result in a chemical burn.

A second example is a financial error application as shown in FIG. 8. The HCC situation is excessive reserves for health care expenditure via an employer benefit plan. The question is the cause of double-digit percentage increases in expenditures. The data sources are selected: (1) HIP-Employer Data; (2) HIP-Payer Data; (3) Materials Data; (4) Facility-Based PHI Data; and (5) Professional-Based Data. Selected records from the data sources are merged, and the master data flow algorithms are executed on the merged data. The Mitigation Model, Recovery Model and Prevention Model algorithms are selected and executed, and the results are output into the Financial Error Profiler. The Financial Error Profiler algorithms are executed, yielding the following findings and anomalies:

1. Payer lacked controls for out-of-network claim payments.
2. Payer lacked controls for payment of non-covered services.
3. Payer programmed incorrect employer sponsored plan criteria.
4. Payer did not have controls for outdated CPT codes submitted by provider.
5. Damages are $3.2 million.

Based on the list of findings and anomalies, an inference may be drawn that significant overpayments were made by the Payer on behalf of the employer.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A self-learning computer-implemented method for identifying an anomaly in a set of healthcare transactions associated with a clinical, financial and/or contractual question, using a computer programmed with instructions stored in a memory responsively coupled to a processor of the computer to execute a query, the method comprising, in accordance with the instructions:

the computer identifying the clinical financial and/or contractual question;

when the computer encounters a header corresponding to a type of data, the computer selecting, or receiving via prompted human input, data of said type in the form of at least two data tables describing the set of transactions based on the question;

the computer merging the selected or received data tables to produce a merged data table;

the computer selecting at least one profiler and at least one model for execution on the merged data table from a plurality of profilers and a plurality of models stored in a computer-readable storage medium;

the computer executing, with a computer processor reading said storage medium, the at least one profiler and the at least one model on the merged data table to generate query output data;

the computer storing the query output data in a master database, the master database configured to aggregate the query output data with query output data stored in the master database in a previous execution of the query;

determining when substantial existing data pertaining to the question is in the master database, wherein the order of execution of the profiler and the model is based on the determination;

when substantially no existing data pertaining to the question is in the master database prior to executing the profiler and the model, the computer first executing the profiler on the merged data table to generate profiler output data, when the profiler collects a type of data for which the model does not include a header, updating the model to add the lacking header, and then executing the model on the profiler output data to generate the query output data;

when substantial existing data pertaining to the question is in the master database prior to executing the profiler and the model, the computer first executing the model on the existing data stored in the master database, and then reconciling from the model back to the profiler to generate the query output data;

executing an electronic discovery analysis algorithm on the master database containing the query output data to generate at least one anomaly;

deriving at least one conclusion from the at least one anomaly to answer the question; and the computer storing the conclusion in the master database.

2. The method of claim 1 wherein the at least two data tables contain data selected from the group consisting of patient data, provider data, payer data, plan sponsor data and vendor data.

3. The method of claim 1 wherein the master database comprises historical data.

4. The method of claim 1 wherein the master database comprises peer data.

5. The method of claim 1 wherein the profiler is selected from the group consisting of a medical error profiler, a financial error profiler, an anomaly profiler, an internal audit profiler, a fraud awareness profiler and a recovery profiler.

6. The method of claim 1 wherein the model is selected from the group consisting of a detection model, a mitigation model, a prevention model, a response model, a recovery model, an investigation model and a micro level model.

7. A data processing system for identifying an anomaly in a set of healthcare transactions associated with a clinical, financial and/or contractual question, the system comprising:

a computer processor; and a memory responsively coupled to the computer processor containing a set of computer instructions for:

identifying the clinical, financial and/or contractual question;

when the system encounters a header corresponding to a type of data, selecting or receiving via prompted human input, data of said type in the form of at least two data tables describing the set of transactions based on the question;

merging the selected or received data tables to produce a merged data table;

selecting at least one profiler and at least one model for execution on the merged data table from a plurality of profilers and a plurality of models stored in the system;

executing, with the computer processor, the at least one profiler and the at least one model on the merged data table to generate query output data;

storing the query output data in a master database, the master database configured to aggregate the query output data with query output data stored in the master database in a previous execution of the query;

determining when substantial existing data pertaining to the question is in the master database, wherein the order of execution of the profiler and the model is based on the determination;

when substantially no existing data pertaining to the question is in the master database prior to executing the profiler and the model, first executing the profiler on the merged data table to generate profiler output data, when the profiler collects a type of data for which the model does not include a header, updating the model to add the lacking header, and then executing the model on the profiler output data to generate the query output data;

when substantial existing data pertaining to the question is in the master database prior to executing the profiler and the model, first executing the model on the existing data stored in the master database, and then reconciling from the model back to the profiler to generate the query output data;

executing an electronic discovery analysis algorithm on the master database containing the query output data to generate at least one anomaly;

deriving at least one conclusion from the at least one anomaly to answer the question; and storing the conclusion in the master database.

8. A non-volatile storage medium containing computer software encoded in a machine readable format for identifying an anomaly in a set of healthcare transactions associated with a clinical, financial and/or contractual question, the software comprising:

a set of computer instructions for identifying the clinical, financial and/or contractual question;

a set of computer instructions for when the computer encounters a header corresponding to a type of data, selecting or receiving via prompted human input, data of said type in the form of at least two data tables describing the set of transactions based on the question;

a set of computer instructions for merging the selected or received data tables to produce a merged data table;

a set of computer instructions for selecting at least one profiler and at least one model for execution on the merged data table from a plurality of profilers and a plurality of models;

a set of computer instructions for executing the at least one profiler and the at least one model on the merged data table to generate query output data;

a set of computer instructions for storing the query output data in a master database, the master database configured to aggregate the query output data with query output data stored in the master database in a previous execution of the query;

a set of computer instructions for determining when substantial existing data pertaining to the question is in the master database, wherein the order of execution of the profiler and the model is based on the determination;

a set of computer instructions for when substantially no existing data pertaining to the question is in the master database prior to executing the profiler and the model, first executing the profiler on the merged data table to generate profiler output data, when the profiler collects a type of data for which the model does not include a header, updating the model to add the lacking header, and then executing the model on the profiler output data to generate the query output data;

a set of computer instructions for when substantial existing data pertaining to the question is in the master database prior to executing the profiler and the model, first executing the model on the existing data stored in the master database, and then reconciling from the model back to the profiler to generate the query output data;

a set of computer instructions for executing an electronic discovery analysis algorithm on the master database containing the query output data to generate at least one anomaly;

a set of computer instructions for deriving at least one conclusion from the at least one anomaly to answer the question; and a set of computer instructions for storing the conclusion in the master database.

9. The method of claim 1, wherein the instructions to derive at least one conclusion comprise instructions for the computer to execute inference logic on said list of findings and anomalies.

10. The method of claim 6, the method further comprising providing an electronic data analysis tool storing each of the group of models on a computer readable medium, and the instructions further comprising instructions to run the electronic data analysis tool on the computer processor to execute at least one of the models.

11. The method of claim 1, the electronic discovery analysis algorithm being coded as a macro in a database management software program.

12. The method of claim 1, said query output data including the identity of a player associated with a medical or financial healthcare transaction, the additional party and identified party being parties selected from the group consisting of patients, providers, payers, plan sponsors, and vendors.

13. The method of claim 1, said query output data including data describing damages associated with one or more of the set of transactions.

14. The method of claim 1, said query output data including the flow of health information.

15. The method of claim 1, said query output data including an equivalent monetary value of health information.

16. The method of claim 1, said query output data including data describing healthcare service delivery products.

17. The method of claim 1, said query output data including data describing healthcare services.

18. The method of claim 1, said query output data including data describing a consumer healthcare service choice.

19. A self learning, computer-implemented method for identifying an anomaly in a set of transactions, the method including executing a query comprising the steps of:

identifying a clinical or financial question;

selecting transaction data from at least two sources of transaction data based on the question;

selecting at least one profiler and at least one model for analyzing the selected data and generating query output data;

executing with a computer processor the at least one profiler and at least one model to analyze the selected data and generate the query output data;

storing the query output data in a master database on a computer-readable medium, the master database configured to aggregate the query output data with query output data stored in the master database in a previous execution of the query;

determining when substantial existing data pertaining to the question is in the master database, wherein the order of execution of the profiler and the model is based on the determination if substantially no existing data pertaining to the question is stored in the master database, first executing the profiler on the selected data to generate profiler output data and then executing the model on the profiler output data to generate the query output data;

if substantial existing data pertaining to the question is stored in the master database, first executing the model on the existing data stored in the master database and then reconciling from the model back to the profiler to generate the query output data;

executing with a computer processor a data analysis algorithm on the master database to generate a list of findings and anomalies; and deriving at least one conclusion from the list of findings and anomalies to identify the anomaly and answer the question.

20. The method of claim 1 wherein the profiler and the model each comprises an algorithm comprises at least one statistical analytic, wherein execution of the profiler and the model algorithm comprises execution of the statistical analytics to perform a statistical analysis of the selected or received data in the merged data table.

21. The method of claim 19 wherein the master database comprises historical data.

22. The method of claim 19 wherein the master database comprises peer data.

23. The method of claim 19 wherein the profiler is selected from the group consisting of a medical error profiler, a financial error profiler, an anomaly profiler, an internal audit profiler, a fraud awareness profiler and a recovery profiler.

24. The method of claim 19 wherein the model is selected from the group consisting of a detection model, a mitigation model, a prevention model, a response model, a recovery model, an investigation model and a micro level model.

* * * * *